United States Patent
Colineau

[19]

[11] Patent Number: 5,812,333
[45] Date of Patent: Sep. 22, 1998

[54] SYSTEM FOR THE READING OF A MULTITRACK RECORDING MEDIUM FOR ENABLING THE READING OF A NUMBER OF INFORMATION SAMPLES ON THE WIDTH OF EACH TRACK

[75] Inventor: Joseph Colineau, Bures sur Yvette, France

[73] Assignee: Thomson-CSF, Paris, France

[21] Appl. No.: 419,283

[22] Filed: Apr. 10, 1995

[30] Foreign Application Priority Data

Apr. 15, 1994 [FR] France .................................. 94 04520

[51] Int. Cl.$^6$ ...................................................... G11B 5/02
[52] U.S. Cl. ............................ 360/25; 360/63; 360/77.12
[58] Field of Search .............................. 360/77.15, 77.12, 360/77.13, 25, 65, 63; 386/113

[56] References Cited

U.S. PATENT DOCUMENTS

| | | | |
|---|---|---|---|
| 5,233,488 | 8/1993 | Yanagihara | 360/77.15 |
| 5,309,299 | 5/1994 | Crossland et al. | 360/77.12 X |

FOREIGN PATENT DOCUMENTS

| | | |
|---|---|---|
| 0 150 992 | 8/1985 | European Pat. Off. . |
| 0 356 959 | 3/1990 | European Pat. Off. . |
| 0 540 385 A1 | 5/1993 | European Pat. Off. . |
| 1 478 339 | 6/1977 | United Kingdom . |

OTHER PUBLICATIONS

Research Disclosure, "Tracking Utilizing Synchronization Signals", Jan. 1992, No. 333, Emsworth, GB, p. 22.

English Abstract of Japanese Patent 01 138 663, Positioning Control Device for Disk Device, May 31, 1989, Noriaki et al.

Database WPI, Abstract, EP 0094313, Servo Control System for Magnetic Disc Storage Device—Corrects Cyclic Position Errors Between Signal Heads and Corresponding Number of Tracks Using I Iterative Correction of Mis–Position Errors, Nov. 16, 1983.

*Primary Examiner*—Andrew L. Sniezek
*Attorney, Agent, or Firm*—Oblon, Spivak, McClelland, Maier & Neustadt, P.C.

[57] ABSTRACT

A system for the reading of a multitrack recording medium comprising a device enabling the reading, on the width of each track, of a number n of information samples. The system includes a filter enabling the making of several combinations of several samples of a track, these combinations differing from one another by a shift equal to one or more samples; a sub-sampling circuit that chooses a determined combination from among the different combinations of a track under the control of a position predictor; a positional error computation circuit computing the positional error of the chosen combination and giving an error correction signal to the position predictor.

8 Claims, 5 Drawing Sheets

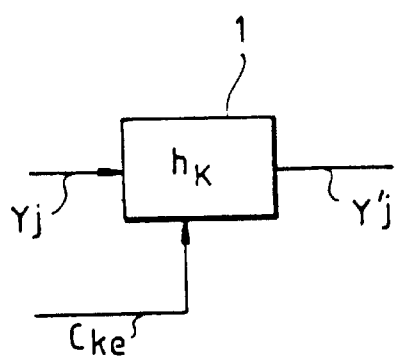
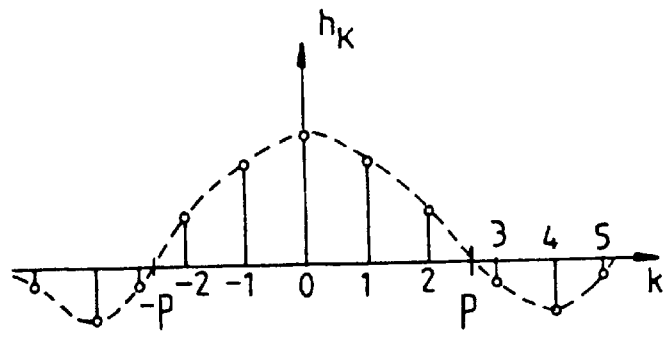
FIG.3a  FIG.3b
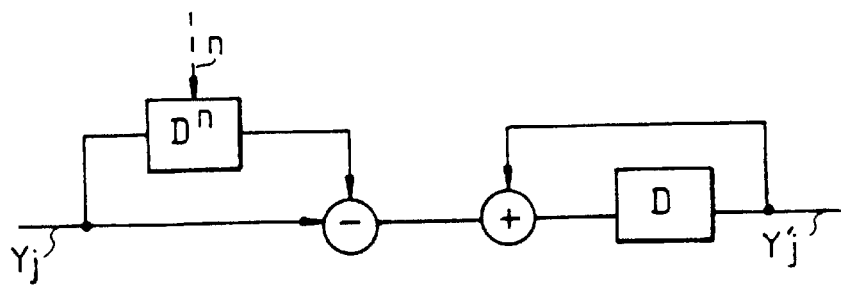
FIG.3c
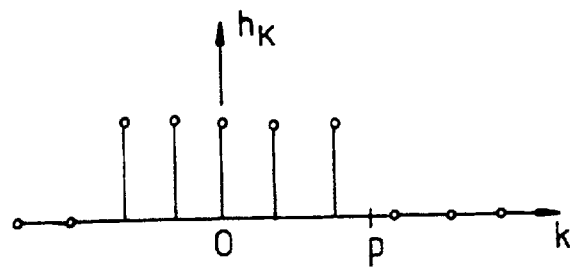
FIG.3d

SYSTEM FOR THE READING OF A MULTITRACK RECORDING MEDIUM FOR ENABLING THE READING OF A NUMBER OF INFORMATION SAMPLES ON THE WIDTH OF EACH TRACK

BACKGROUND OF THE INVENTION

The invention relates to a system for the reading of a multitrack recording medium and more particularly to a system for the reading of a multitrack magnetic tape.

The reading of magnetic tapes of different formats raises a problem of the matching of the reader with the different formats. The difficulty is even greater when the recording medium is liable to get deformed through mechanical stresses applied to the tape or because of the shrinking of the tape.

Finally, the acceptance of helical or longitudinal formats on one and the same reader cannot be resolved by conventional methods.

This invention is based on the use of multitrack reading heads as described in the French patent application No. 89 17313. This application describes a circuit used to process the output signal from such heads so as to restore, as efficiently as possible, the information recorded on each of the physical tracks of the recording medium. This circuit can operate with a variety of longitudinal recording formats, possibly affected by shrinking, as well as with helical formats. Furthermore, it enables the performance of a tracking function that is "static" (without any actuator).

Various approaches enabling reading compatibility have been proposed. For example, the French patent application No. 91 13314 describes a multiformat reading system adapted to longitudinal recording.

The proposed system can be applied not only to longitudinal formats but also to helical formats. Furthermore, it is well suited to the fast tracking of positional fluctuations of the physical tracks.

SUMMARY OF THE INVENTION

The invention therefore relates to a system for the reading of a multitrack recording medium comprising a device enabling the reading, on the width of each track, of a number n of information samples wherein said system comprises:

a filter enabling the making of several combinations of several samples of a track, these combinations differing from one another by a shift equal to one or more samples;

a sub-sampling circuit that chooses a determined combination from among the different combinations of a track under the control of a position predictor;

a positional error computation circuit computing the positional error of the chosen combination and giving an error correction signal to the position predictor.

BRIEF DESCRIPTION OF THE DRAWINGS

FIGS. 3a and 3b illustrate signal samples using a transversal filter;

FIGS. 3c and 3d illustrate signal samples using a sliding average filter;

MORE DETAILED DESCRIPTION

Figures 1A, 1B:
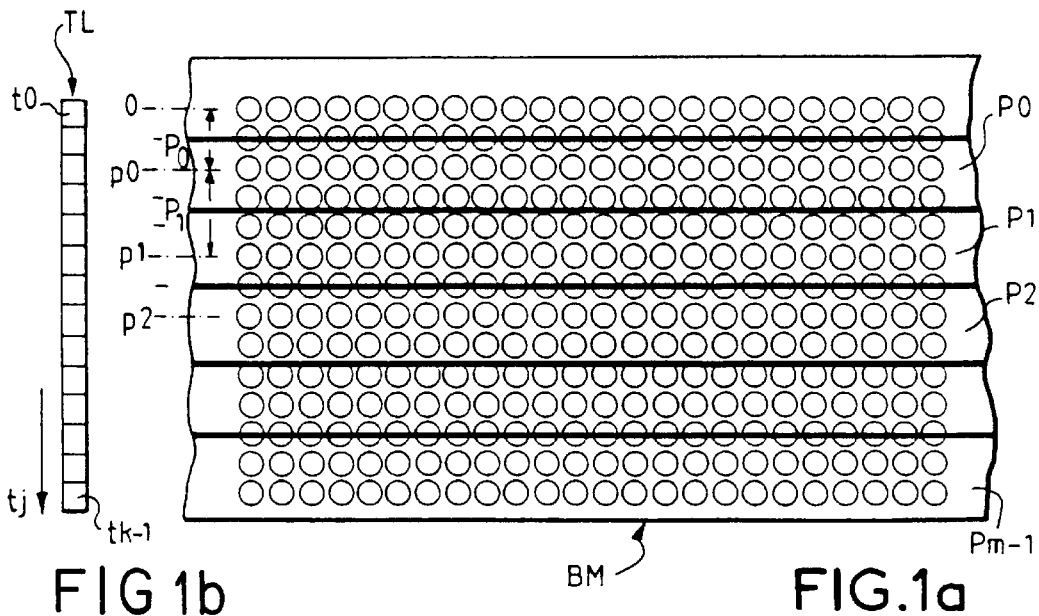
FIGS. 1b and 1d illustrate a multitrack reading head.
FIGS. 1a and 1c illustrate configurations of magnetic tapes.
Figures 1C, 1D:
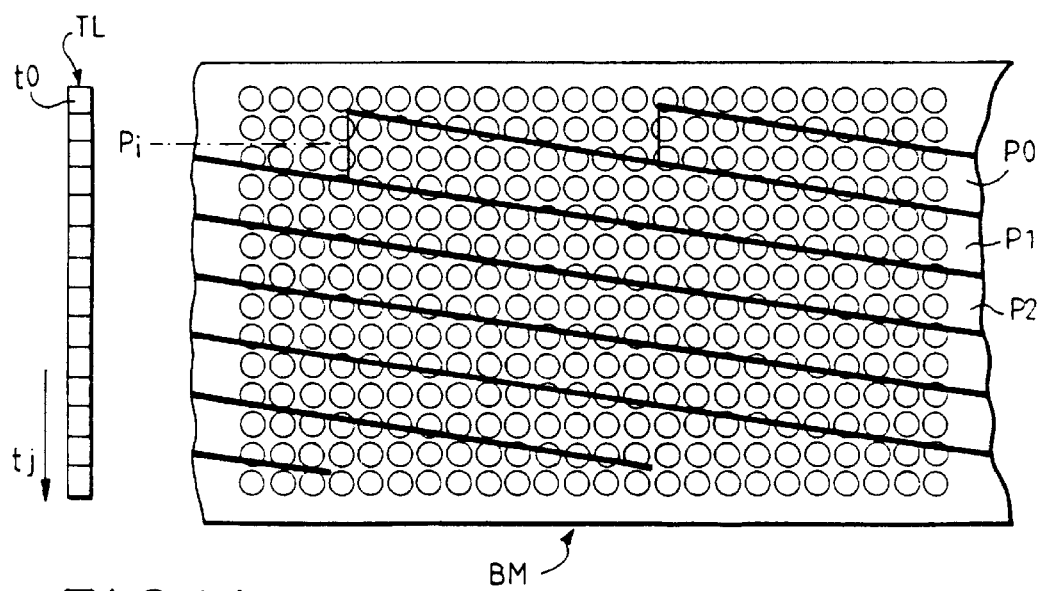

The invention can be applied to the reading of magnetic tapes such as those shown in FIGS. 1a and 1b. In FIG. 1a, the information tracks P0 to Pm-1 have been recorded longitudinally with respect to the tape. The format is said to be longitudinal. In FIG. 1b the recording format is helical. On the left-hand part of the tapes, a row of reading heads t0 to tk1 is shown. This row of reading heads is called a multitrack reading head TL.

On the magnetic tapes, each point represents the zone of the medium read by one of the head elements, namely a reading sample. In these figures, $t_j$ represents the head number and p0, p1, p2, . . . represent the physical positions of the center of tracks. The recording medium has m physical tracks P0 to Pm-1, each of them being read by means of n samples (n not necessarily being an integer).

Figure 2:
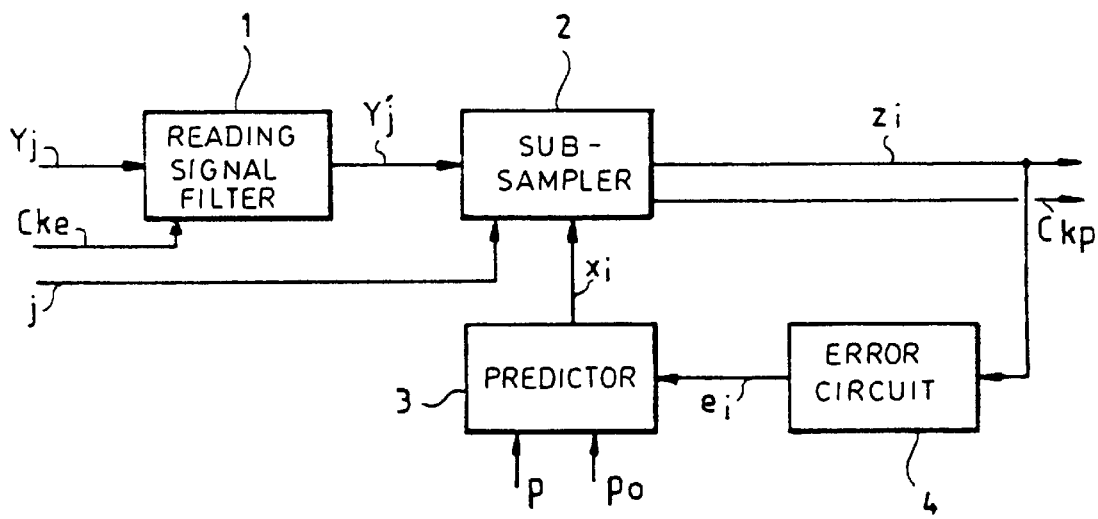
FIG. 2 shows a circuit according to the invention.

The processing circuit that enables the reconstitution, from the reading samples $y_j$ read by the heads, of the signal samples $Z_i$ on each of the tracks is shown in FIG. 2. It has the following elements:

a filter 1 combining several consecutive reading samples $y_j$, to prepare samples $y'_j$ whose signal-to-noise ratio is improved;

a sub-sampler 2 making it possible to choose only the signal sample $Z_i$ corresponding to samples $y'_j$ for which j corresponds to the physical position of the center of a track. This sub-sampler could have a phase shifter function to interpolate the signal if the physical position of a track does not correspond to an integer value;

an error circuit 4 enabling the detection of a residual positional error $e_i$ of the reconstituted signals $Z_i$;

a predictive filter 3 giving the estimated position $x_i$ of the physical tracks on the basis of the known elements of the format of the tape: number of tracks m, pitch of the tracks p and possibly the theoretical position of the track 0 as well as the observed positional error $e_i$.

This circuit which works in a closed loop is capable of the real-time tracking of the positional variations of the physical tracks due to the positional variations of the tape (guidance errors) or to its physical deformation (shrinking, expansion due to temperature and hygrometry etc.).

In the case of a helical recording where the physical positions of the tracks varies continually, this predictive filter enables resetting on the center of the tracks and the following of their progress.

At output of this circuit, samples assigned to the tracks i are available. In longitudinal recording, they may be processed sequentially in a processing circuit that works in a multiplexed mode on a certain number of tracks. On the helical formats, it is possible, at the start of processing or during processing, to reorganize the data elements in a memory enabling the reconstitution of the physical tracks which have finite length. This operation can be advantageously performed at the time of the reconstitution and realignment of the data blocks. It is enough to make transmission, up to this step of the processing operation, of an information element (flag) identifying the position of one of the tracks which shall conventionally be called "the track 0".

In FIG. 2, the different references of the signals have the following meanings:

$y_j$: reading samples j: current sample number
zi: samples of the signal of the track i
i: track number
$e_i$: positional divergence of the track i
$p_o$: theoretical position of the track 0
p: theoretical pitch of the tracks
$x_i$: estimated position of the track i
$C_{KE}$: reading samples clock cycle
$C_{KP}$: track samples clock cycle
n: average number of samples per track.

A description shall now be given in greater detail of the functions of the circuits of FIG. 2.

The role of the filter 1 is to combine neighboring signal samples belonging to the same track in order to improve the signal-to-noise ratio. The ideal pulse response of this filter is the one that makes the signal-to-noise ratio the maximum while at the same time having zeros at distances that are multiples of the period p of the tracks (in reality, it is the convolution of the transversal pulse response of the reading head by this filter that should have zeros at the pitch of the tracks: if the reading head shows crosstalk, it is possible to compensate for it by means of this filter). If an adequate signal-to-noise is available, this filter could be omitted.

For a small average number of samples per track n, this filter could be a transversal filter (FIG. 3a). This filter gives as many combinations of samples as there are samples transversely to the tape. Each combination takes account of a constant number of samples. One combination differs from a neighboring combination by the shifting of one sample. For n as a high value, it will be simpler to make a sliding average filter (FIG. 3b). Herein D represents a delay circuit representing a delay by one clock cycle $C_{ke}$, and $D^n$ represents a delay circuit with a delay of n periods of the same clock cycle.

Figure 4:
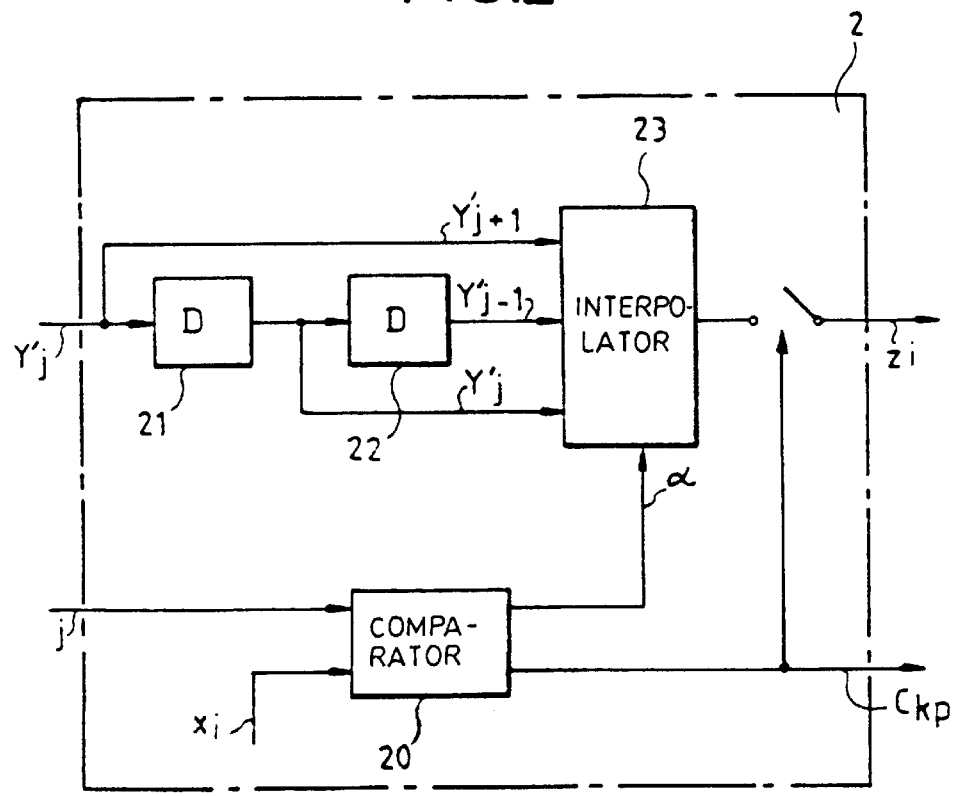
FIG. 4 shows the sub-sampling device 2 of FIG. 2.

The sub-sampling device 2 shown in FIG. 4 receives the filtered samples $y'_j$ and prepares signal samples $z_i$ for each of the tracks i.

For this purpose a comparator 20, on the basis of the number j of the current sample and the estimated position $x_i$ of the sample, prepares a command $C_{kp}$ for the validation of the sample $Z_i$ when the two elements coincide, at least as far their integer part is concerned.

Should the operation be done with a low oversampling factor n in the cross-wise direction, the quality of the signal $Z_i$ can be improved by preparing an interpolation. Indeed, the estimated position $x_i$ generally does not correspond to an integer value and therefore to a precise sample position j. The fractional part of $x_j$, referenced α, is then used to select a set of coefficients of a short transversal filter achieving an interpolation between, for example, three successive values of $y'_j$. The delay circuits 21 and 22 enable these three values to be given. The interpolator 23 receives the three values $y'_{j-1}$, $Y'_j$ and $y'_{j+1}$. It also receives the fractional value α of $x_i$ from the comparator 20. This enables it to make a choice, from among the three values $y'_{j-1}$, $Y'_j$ and $y'_{j+1}$, of that value which should give rise to $Z_i$.

It is thus possible to obtain efficient operation of the unit and optimal use of the reading signal even for fractional and small (n <2) values of n.

Figures 5A, 5B:
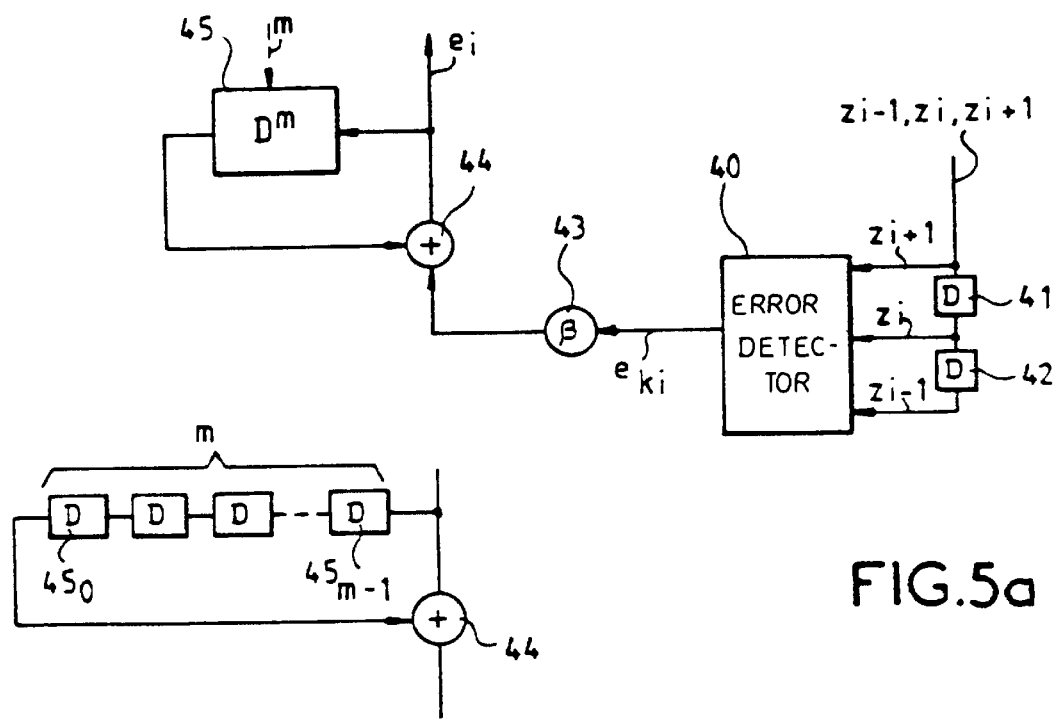
FIGS. 5a and 5b show the error circuit 4 of FIG. 2.

The positional error circuit 4 shown in FIG. 5a receives the track sample $Z_i$ and prepares an error signal in observing the residual intercorrelation between reconstituted tracks. The algorithm is the following:

instantaneous error $=Z_i \times \text{sign}(z_{i-1,}) - z_i \times \text{sign}(Z_i + 1)$.

The delay circuits 41 and 42 enable the simultaneous presenting of the samples $Z_{i-1}$, $Z_i$ and $Z_{i+1}$ to the error detector 40. This error detector carries out the preceding algorithm operation.

The originality of this algorithm lies in the fact that, as an approximation of the recorded signal on the neighboring tracks and in order to estimate the intercorrelation, it uses the sign of the reconstituted signal $Z_i$ and not the decoded signal itself. The approximation that is done consists in overlooking the sampling phase of $Z_i$ which is any phase. Indeed, a pre-decoding is done without any reconstitution of the clock signal. This method has a twofold advantage: its simplicity and the fact that no additional delay is created as would be the case if the $Z_i$ values had to be completely decoded. It follows that the positional servo-control loop thus obtained is speedier and does not interfere with the other loops of the system (PLL etc).

This algorithm entails the assumption that the signals written on the neighboring tracks are independent. If not, it is possible to estimate the intercorrelation of the signals of neighboring tracks and make a correction.

The instantaneous error is filtered in a recursive filter 44, 45 working in a multiplexed manner on m recorded tracks. This filter has a circuit 45 such as a shift register enabling the recording of m instantaneous error values $e_o$ to $e_{m-1}$ corresponding to the m tracks of the tape. At each operation of the error circuit, the circuit 45 goes forward by one step and presents a previously estimated error value to the adder circuit 44. A weighting coefficient β given by the circuit 43 fixes the response time of the filter.

The circuit 45 may be made as shown in FIG. 5b. It has as many circuits $45_o$ to $45_{m-1}$, series-connected, as there are tracks. At each reception of an error signal $e_{ki}$, this signal is added by the circuit 44 with the error signal previously computed for the same track and given by $45_o$. In addition, the current error signal is recorded in the circuit $45_{m-1}$.

Figure 6A:
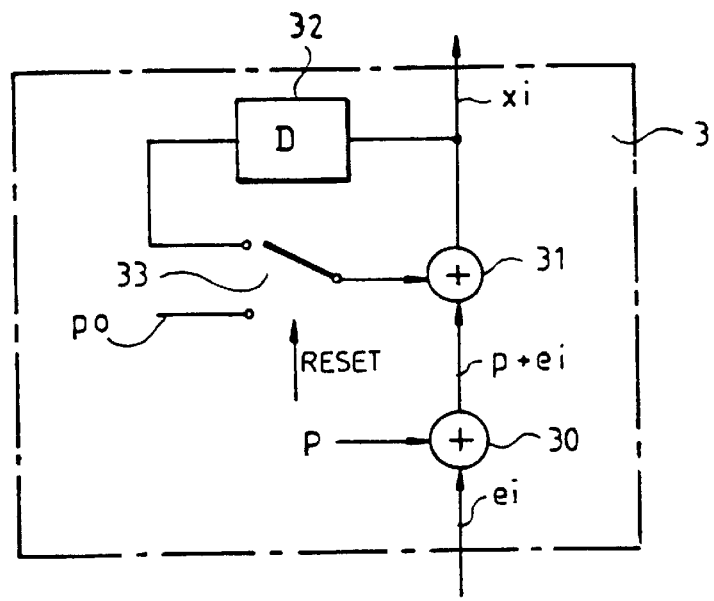
FIGS. 6a and 6b show the predictive filter 3 of FIG. 2
Figure 6B:
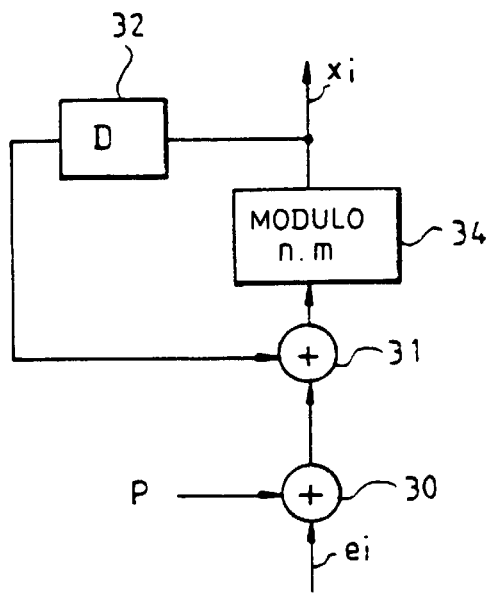

As represented in FIG. 6b predictive filter 3 essentially has an integrator 31, 32. The circuit 32 is a circuit of the shift register type enabling the recording of m computed positions of tracks. At each instant it gives the adder circuit 31 a previously computed track position.

The adder circuit 30 receives an instantaneous error signal $e_i$ and adds it to the mean value of the pitch p of the tracks.

This predictive filter prepares the estimated position of the physical tracks $x_i$ with the following being known: $p_0$ the theoretical position of the track 0 and p the mean pitch of the tracks. The integrator, which is reset at $p_0$ at the start of each frame of samples by the circuit 33, receives p and $e_i$ at its input. At each clock period $C_{kp}$, it thus prepares a new value of $X_i$ according to the equation:

$$x_i = x_{i-1} + p + e_i$$

If the error signal of one or more tracks is not available (owing to a drop-out or clogging of a head for example), ei =0 and the integrator estimates the position of these tracks according to the position of the previous tracks and the pitch of the tracks which is known. The prediction error therefore remains low. The prediction is very sound, even when there are disturbed signals. Furthermore, a positional deviation detected on a track is passed on to all the tracks. The mean position of the track or, what is equivalent, the position of the tape before the heads may therefore be estimated and followed with precision. The system therefore carries out an operation of the static tracking of the tracks. It can be used for this function only, independently of its multiformat possibilities. In this case, n will be chosen so as to be as low as is permitted by the transversal sampling without generating excessive spectral aliasing.

In the case of the helical format, $p_0$ is not fixed. As represented in FIG. 6b one method consists, in this case, not of the performance of the initial loading of the integrator $p_0$ but of the insertion, in the loop of the integrator, of a circuit 34 carrying out a modulo n.m function, where n.m represents the number of reading samples effectively useful for the reading of m oblique tracks. The circuit then automatically carries out the tracking of the oblique tracks. This modulo function can be used similarly for longitudinal formats.

What is claimed is:

1. A system for the reading of a multitrack recording mediums comprising:

a device for reading, on the width of each track, a number n of information samples;

a filter for making several combinations of a plurality of said n information samples of a track, said combinations differing from one another by shift equal to one or more samples;

a sub-sampling circuit for selecting a determined combination from among the different combinations of a track;

a position predictor for controlling said sub-sampling circuit;

a positional error computation circuit computing the positional error of said determined combination and outputting an error correction signal to the position predictor.

2. A reading system according to claim 1, wherein the error computation circuit comprises a circuit to compute the difference between the products that are obtained by multiplying a value of the determined combination and signs of values of the information samples of the neighboring tracks.

3. A reading system according to claim 2, wherein the positional error computation circuit comprises a memory circuit comprising as many compartments as there are tracks, each compartment being designed to contain a value of an error correction signal relating to a track.

4. A system according to claim 3, wherein the memory circuit is a shift register.

5. A reading system according to claim 1, wherein the position predictor comprises an integrator circuit comprising a memory circuit comprising as many compartments as there are tracks, each compartment being designed to contain a previously computed track position value, a control circuit giving a positional value to the integrator circuit to integrate it with a previously computed positional value.

6. A reading system according to claim 5, wherein the memory circuit is a shift register, the integration is done by means of an adder circuit and an adder receives a computed positional error value, adds it to a track pitch value and gives the value of this addition to the adder circuit.

7. A system according to claim 6, comprising a circuit performing a modulo n.m function, n being the average number of samples per track and m being the number of tracks to be read, said circuit being located in series with the memory circuit and the adder circuit.

8. A reading system according to claim 5, wherein a resetting circuit gives a resetting signal at the start of said reading, said resetting signal representing the theoretical positional value of the first track in an adder circuit instead of a track positional value given by the memory circuit.

\* \* \* \* \*